INVENTORS
PHILIP G. THORNHILL
JAMES M. MAC KAY
BY
ATTORNEYS

March 29, 1960 P. G. THORNHILL ET AL 2,930,687
ROASTING OF ORES
Filed Aug. 27, 1956 2 Sheets-Sheet 2

INVENTORS
PHILIP G. THORNHILL
JAMES M. MAC KAY
BY
Pennie, Edmonds, Morton, Barrows & Taylor
ATTORNEYS United States Patent Office 2,930,687
Patented Mar. 29, 1960

2,930,687

ROASTING OF ORES

Philip G. Thornhill, Falconbridge, Ontario, and James M. MacKay, Toronto, Ontario, Canada, assignors to Falconbridge Nickel Mines Limited, Toronto, Ontario, Canada, a corporation of Canada Application August 27, 1956, Serial No. 606,453

7 Claims. (Cl. 75—9)

This invention relates to the roasting of ores and has for its object certain improvements in the method of and apparatus for roasting ores. The invention relates more particularly to such improvements useful in the roasting of sulphide ores, especially by the technique known as fluidized bed roasting.

The invention is particularly useful in conjunction with the method and apparatus disclosed in Belgian Patent 537,802 of April 30, 1955, to Falconbridge Nickel Mines Limited. As therein explained, the method relates to the roasting of metal sulphide concentrates in a fluidized bed. A slurry is prepared by mixing metal sulphide concentrates with an aqueous liquid, one that may contain, for example, an alkali metal salt, such as sodium sulphate. The slurry is sprayed into and through the hot freeboard space above the fluidized bed to produce a great multiplicity of very small wet agglomerates, the wet agglomerates being formed of a plurality of concentrate particles bonded at least in part by the liquid of the slurry. Excess aqueous liquid freed from the slurry, as a result of the formation of the wet agglomerates, is vaporized completely in the freeboard with hot gases rising from the fluidized bed to prevent the freed liquid from reaching and wetting the fluidized bed. The freshly formed agglomerates are passed through an extended path of travel in the hot freeboard for the removal of their moisture. While the agglomerates are in transit in their extended path of travel through the freeboard, the moisture is evaporated from the agglomerates to produce dried agglomerates and thus prevent damp agglomerates from reaching and dampening the fluidized bed. The resulting mixture of vapors and gases is vented in the upper portion of the freeboard. The dried agglomerates are dropped onto the fluidized bed for roasting. The agglomerates in the fluidized bed are maintained continuously dry to inhibit bonding thereof into oversize lumps which would operate to defluidize the bed. The dry agglomerates are roasted in the fluidized bed. The agglomerates are maintained generally in their same physical size and shape during the roasting operation to insure uniform fluidity of the bed. The resulting calcined agglomerates are removed from the calcined bed.

A number of difficulties are encountered in such a practice. The ore concentrates are highly abrasive and therefore highly corrosive, in wear and tear, on the device employed to spray the slurry. While the device is made normally of metal, the concentrate particles are so abrasive as soon to destroy the usefulness of the device. The cost of replacements may be high; but even more serious are the numerous delays in furnace operation required to make the necessary replacements. Such interruptions are costly. They also result in a roasted concentrate of unequal quality.

In most operations involving the transport of slurries, a very real hazard is the presence in the slurry of tramp or oversize solids, including clusters of solids, which block restricted passages. The production of a fine spray from such slurries usually involves the passage of the slurries through some form of constriction. This causes a serious blockage problem. The passageway must be cleared, again requiring time and expense, and the closing down of the operation.

It is difficult also to manipulate the slurry in such a way as to regulate or control the formation of droplets of the slurry. This applies to the size of the droplets, or range of sizes, as well as their constancy of formation. This is all reflected in turn in the size, or range of sizes, and constancy of formation of the desired agglomerates of ore concentrates.

Our investigations have led to the discovery that such, and related, difficulties can be overcome for the most part when proceeding in accordance with the present invention.

The invention will be better understood by referring to the accompanying drawings, taken in conjunction with the following description, in which.

Figure 1:
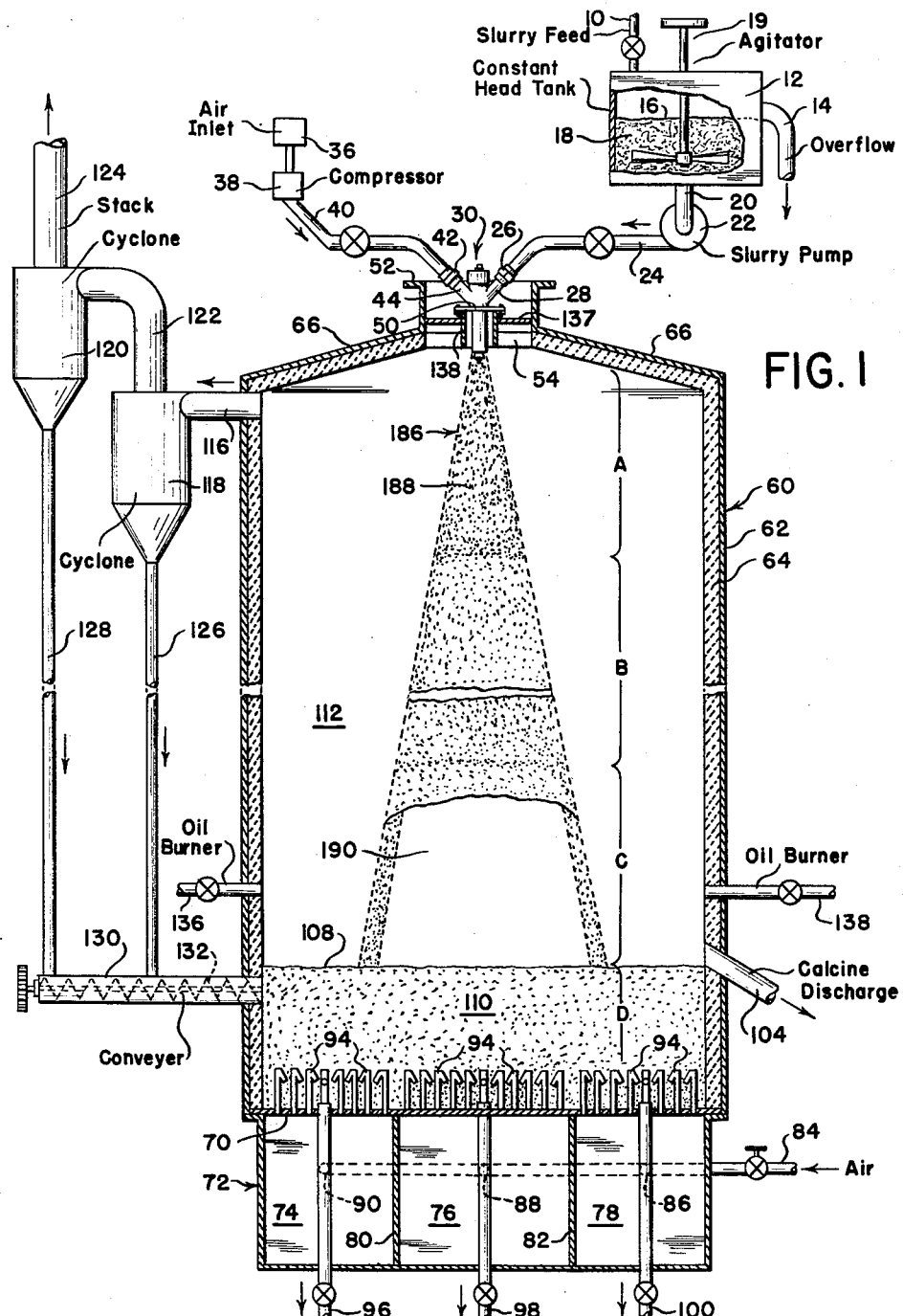
Fig. 1 is a diagrammatic side elevation, mostly in section, of a form of apparatus illustrative of a practice of the invention, showing a fluidized bed roasting furnace with a feed gun mounted on the top thereof.

Referring first to Fig. 1, the apparatus shown includes a valved slurry feed line 10 depending over a constant headtank 12, provided with an overflow line 14 near its top to maintain a constant level 16 of slurry 18 in the tank. A mechanical agitator 19 is positioned in the tank to keep the concentrate particles suspended in the liquid. Connecting the bottom of the tank is a discharge line 20, a slurry pump 22 and a valved feed line 24, fitted at its end with a coupling 26. The coupling connects with a slurry inlet 28 of a feed gun 30 of the invention.

An air inlet 36 connects with an air compressor 38, which in turn connects with a valved air line 40, fitted at its end with a coupling 42. The coupling connects with an air inlet 44 of the feed gun. The feed gun and its operation will be described in more detail below.

As shown, the feed gun extends vertically through a flat horizontal mounting flange 50 mounted in a bonnet 52 located centrally around a feed well 54 on the central top or roof portion of a fluidized bed roaster 60.

The fluidized bed roaster shown diagrammatically is generally circular in horizontal cross-section, being formed of an outer metal shell 62, an inner insulated wall 64, and a conically shaped roof 66. A hearth 70 extends horizontally across the bottom of the roaster. The under side of the roaster is furnished with an air-distributor or wind-box 72, divided into a plurality of compartments 74, 76, 78 by partitions 80, 82. A valved air-distributor line 84 extends along the far side of the box. Branch outlets 86, 88, 90 connect the distributor line with the compartments. The branch inlets are provided with valved meters, not shown, to regulate and measure the amount of air fed into each compartment.

Hearth 70, usually formed of a plurality of plates, is provided on its top with a plurality of spaced and raised air-discharge nozzles 94; and on its bottom with centrally disposed valved discharge pipes 96, 98, 100, the upper ends of which extend slightly above the hearth. The discharge pipes depend vertically through and below the compartments.

The roaster is provided with a calcine discharge conduit 104, being located to maintain an optimum predetermined level 108 of a fluidized bed 110 of agglomerated material undergoing treatment below freeboard space 112.

A gas-fines discharge duct 116 connects the top portion of the roaster with a gas-fines separator 118, such as a cyclone. The cyclone advantageously connects with a second gas-fines separator 120, such as another cyclone, by means of a pipe 122. A stack 124 extends from the second or last cyclone to the open atmosphere.

It is advantageous to return the fines, separated from the roaster gases in the cyclones, to the roaster for retreatment. To this end down-comers 126 and 128 extend from the cyclones to a lateral feed tube 130 fitted with a power-driven screw conveyor 132. The discharge end of the tube connects with the fluidized bed 110 at a point below its top surface.

One or more heaters 136, 138, such as oil or gas burners, are connected with the roaster to bring its chamber to temperature to initiate the roasting operation. The heaters are located advantageously just above the surface of bed 110.

Figure 2:
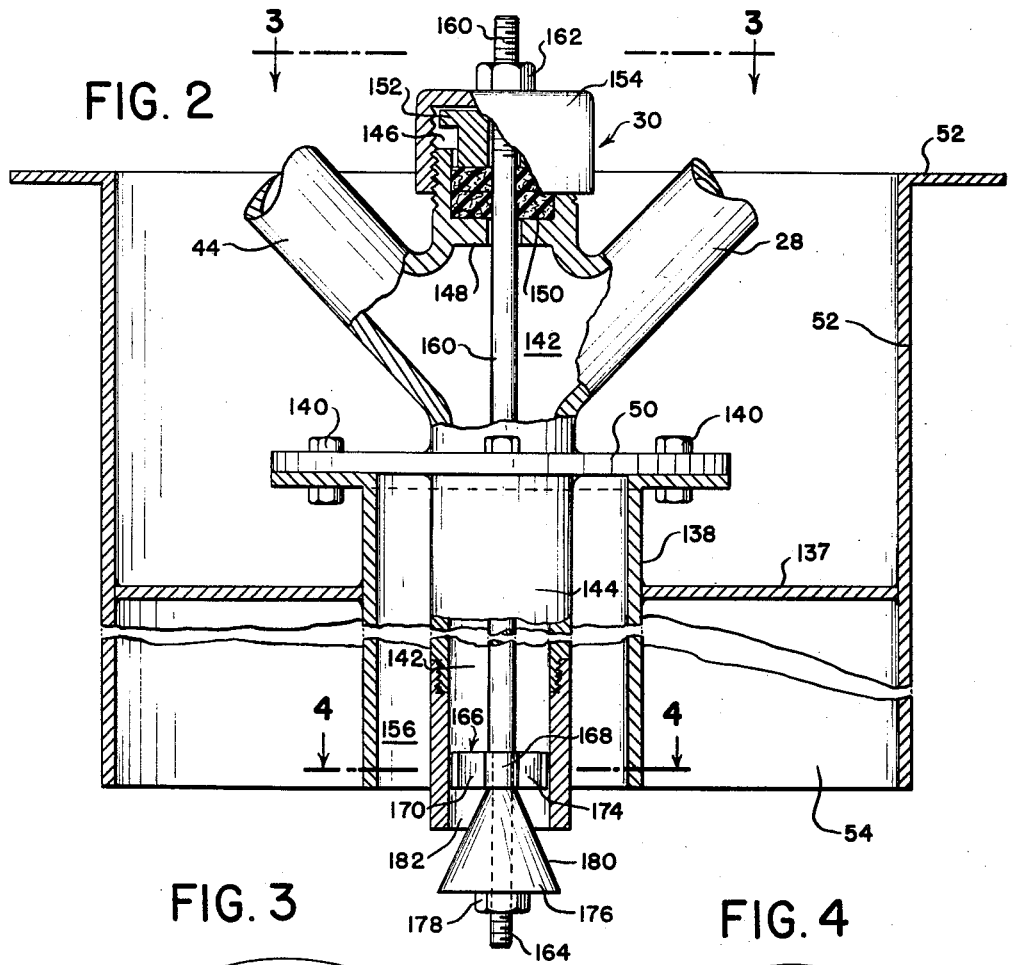
Fig. 2 is an enlarged side elevation, partly in section, of the feed gun.
Figure 3:
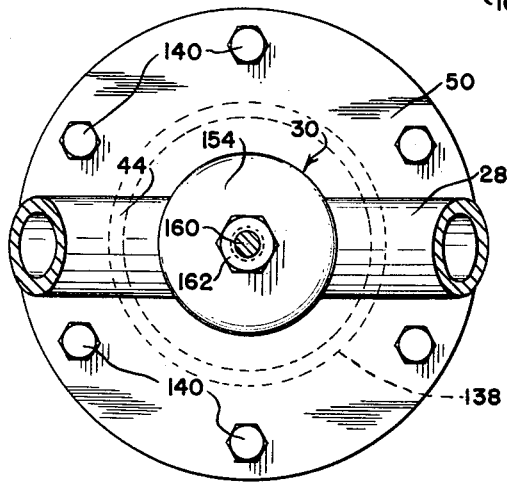
Fig. 3 is a plan view of the feed gun, as shown in Fig. 2, looking downwardly from the line 3—3.

Referring next to Fig. 2, feed gun 30, as noted above, extends vertically through a flat mounting flange 50 mounted in bonnet 52 of feed well 54. A transverse cover 137 extends across the feed well, near its bottom. A centrally disposed pipe flange 138 depends vertically through the cover and is integrally secured thereto. The flat mounting flange of the feed gun is non-leakably secured to the pipe flange by means of a plurality of spaced bolts 140, thus holding the feed gun in vertical alignment over the freeboard of the furnace.

Slurry inlet 28 and air inlet 44 of the feed gun connect with the interior passageway 142 of a vertically depending barrel 144. The upper end of the barrel is closed and the lower end is open. The upper end terminates in a housing 146 provided interiorly with a bottom 148, a pressure seal packing or gland 150, and a collar 152. The exterior of the housing is threaded and fitted with a screw cap 154. The lower end of the barrel is fitted with a removable barrel extension 156; the two barrel portions being screwed together, as shown in Fig. 2. An advantage of the barrel extension is that it may be replaced easily, either by one of the same length, or shorter, or longer, as desired.

Figure 4:
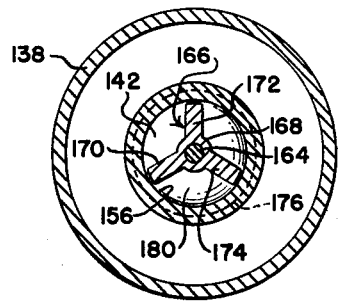
Fig. 4 is a section on the line 4—4 of Fig. 2.

The feed gun is also provided with a centrally disposed spindle 160, the upper end of which extends through the housing—including the packing, collar and cap—and terminates in a threaded portion fitted with a lock nut 162. The lower portion 164 of the spindle is of smaller diameter, to receive and hold a spider 166, to keep the spindle vertically and centrally located in passageway 142. When the barrel and spindle are quite short, the spindle may be made sufficiently rigid at the housing to maintain its central position in the barrel; and the spider may be omitted. The spider is shown in sectional detail in Fig. 4. It is provided with a hub 168, through which extends the spindle, and from which extend a plurality of radial arms 170, 172, 174 almost to the interior wall of the barrel. The arms provide a sliding fit of the spider as a whole in the barrel. Since it is secured to the spindle, the spider slides easily in the barrel.

Returning to Fig. 2, the lower end of the spindle terminates in a deflecting member 176, secured to the spindle by a lock nut 178. In the instant construction, the deflecting member is generally conical in shape, strictly the frustum of a cone. In any event, the member provides a generally conical surface 180, which is partly inside and partly outside of the discharge end of the barrel. Together with the barrel it provides an annular orifice 182, through which the slurry and compressed air may escape from the barrel, only to be deflected downwardly and outwardly in the freeboard of the furnace; as will be described below in more detail. The upper portion of deflecting member 176 bears against spider 166 and securely holds it in position on the spindle with the aid of lock nut 178.

The apparatus just described may be operated in the following manner:

Previously calcined agglomerates of the concentrates are fed to the roaster through one or more closable openings, not shown, to build up a starter-bed. Such a bed is necessary to initiate the roasting operation to follow. That is to say, the material to be roasted must be mixed in the roaster with material that has already been roasted. Prior to the introduction of raw sulphide concentrates, the starter bed must be heated to a temperature sufficiently high to permit the roasting operation to be self-sustaining. To this end (Fig. 1) oil or gas burners 136, 138 are used to provide the preliminary heat. When the bed reaches the temperature required to initiate the combustion of the sulphides, the burners are shut off.

Slurry 18 is formed, for example, by mixing the concentrates with a water solution of sodium sulphate, after which it is passed (Fig. 1) through feed line 10 into tank 12. A sufficient amount is fed into the tank to cause a continuous overflow of slurry through line 14 to maintain the body of slurry in the tank at predetermined level 16. Agitator 19 keeps the concentrate particles in suspension in the water solution. The slurry leaves the tank through discharge line 20 and is driven by a pump 22 and a feed line 24 through slurry inlet 28 of feed gun 30. Simultaneously compressor 38 delivers air through line 40 into air inlet 44 of the feed gun. The compressed air and the slurry come together in the barrel of the feed gun. Variables involved in the operation are controlled to cause the slurry issuing from the feed line to spread and spray downwardly into freeboard 112.

Referring to Fig. 2, it will be seen that the slurry from inlet 28 and the compressed air from inlet 44 come in contact with each other in interior passageway 142 of vertically depending barrel 144. Spindle 160 is moved up or down until annular orifice 182 reaches its optimum size. That size is then maintained by turning lock nut 162 tightly against the top of cap 154. This maintains the adjustment of the spindle relative to the barrel against the thrust exerted on the spindle and deflecting member 176, when air and slurry are flowing through the gun. The compresed air and slurry are forced through their respective inlets at a controlled rate and pass along the barrel to the annular discharge orifice. The violence with which the compressed air expels the slurry through this annular orifice is sufficient to cause it to leave the deflecting member in the form of a shower of slurry droplets.

Features of the design shown which minimize wear are the relatively large size of both air and slurry inlets and the acute angle at which these inlets are placed in relation to the center line of the barrel. It is particularly important that the air inlets be large enough as otherwise a high velocity jet of air will impinge abrasive particles against the spindle and the inside of the barrel and cause extremely rapid and localized wear. In practice it is convenient to have air and slurry inlets of the same size, thus making them interchangeable.

A further important feature of the design shown which minimizes wear is the opposition of the two inlets one to another so that there is no tendency for a flow pattern to be set up in the barrel which will spiral along the barrel and cause excessive wear on the barrel and spider. The kinetic energy of both air and slurry inlet streams may be resolved into directional components normal and parallel to the center line of the gun. Wear on the inner surface of the barrel and on the spindle opposite to the air and slurry inlets is caused, in the main, by impingement on these surfaces of abrasive particles moving with a kinetic energy component normal to the center line of the gun. By opposing the inlet streams of air and slurry, the kinetic energy components of the streams normal to the center line of the gun are to a large degree canceled out and wear on the barrel and spindle is thereby minimized.

In the particular application of the feed gun, it can be calculated that the volumetric ratio of air to slurry in the gun is about 10 to 1 when, as is normally the case, the gauge pressure in the barrel of the gun is 6 pounds per square inch. This means that the slurry and compressed air passing through the barrel of the gun do not take the form of a continuous column of dense slurry containing small bubbles of air; rather, they take the form of a column of air into which discontinuities are introduced by the presence of slugs of slurry. Thus, in operation of the gun, the slugs of slurry are forced down the barrel of the gun by the pockets or bubbles of compressed air until they reach the annular opening between the surface of the cone and the inner circumference of the barrel tip. Here the reduction in cross-sectional area affords an annular constriction which, when encountered by a slug of slurry, causes a momentary build-up in the pressure of the pockets of air in the barrel of the gun. The built up pressure forces the slug of slurry through the annular opening with an explosive impulse which breaks the slurry up into droplets; the discharge of the slurry is followed by the expulsion of the pocket of compressed air, which results in a momentary drop in pressure in the gun barrel. The pressure is again built up with entry of the next slug of slurry into the annular space, and the process is repeated, resulting in a rapid pulsating action which can be felt by touching the exposed portion of the feed gun.

The passage of, alternately, slurry slugs and pockets of air through the annular space thus results in a continuous series of minor explosions, such explosions being sufficiently violent to break up the slurry slugs into droplets and simultaneously to expel them in a family of trajectories which conform substantially to a projection of the surface of a cone. The size range of the slurry droplets thus formed is dependent upon the violence with which the explosions are made to occur; the violence of the explosions is, in turn, dependent upon the extent to which pressure is permitted to build up in the explosive cycle. The latter is obviously a function of the cross-sectional area of the annular space through which the slurry and air must pass, and of the rate at which air and slurry are introduced into the gun. Thus it is possible to vary the size range of the droplets ejected by the gun by adjusting the cone or by varying the rate at which compressed air is passed into the gun.

The operating principle of the present invention should not be confused with that of prior art "spray heads" or "spray nozzles" which employ compressed air to obtain a spraying action. Such prior art apparatus can, for example, take the form of two concentric tubes, liquid or slurry being passed through the inner tube, and high pressure, high velocity air being passed through the annular space between the inner and outer tubes. At the tip of the nozzle thus formed, the energy of the high velocity air is imparted to the slurry which it encounters at that point, and the slurry is broken up into a spray by shearing action. If the slurry or liquid is abrasive, the "sand blasting" effect in nozzles of this type results in rapid wear of the metal surfaces, with consequent failure of the nozzle. Successful operation of the present invention, on the other hand, does not depend upon the high velocity shearing action of a jet or jets of compressed air, but rather upon the explosive action of relatively slow-moving pockets of compressed air and slurry slugs as they pass through the annular orifice of the feed gun.

The practice of the present invention is to be distinguished also over the use of the type of spray nozzle which operates without compressed air. This type of nozzle has two real objections: (1) because of the constrictions required to achieve the necessary spray velocities, a plugging of the spray openings by wood chips and other unavoidable tramp material in the slurry is a practically insurmountable problem; and (2) the relatively high slurry pressure required causes excessive wear on the slurry pump. These objections are largely overcome with the present invention.

In a present practice of the invention the inside diameter of the air and slurry inlets is 1", the inside diameter of the barrel is 1½" and the angle between the center lines of the inlets and the center line of the barrel is 45°. The gun is fabricated throughout of stainless steel. No excessive wear was apparent on the inlet pipes, barrel, or spindle after some 1,500 hours of continuous operation, during which period a total of about 6,000 dry tons of finely ground and highly abrasive pyrrhotite, as a slurry containing about 65 percent pyrrhotite by weight, were pumped through the gun.

The action whereby the range of droplet size of slurry in the spray produced by this gun can be changed is as follows: by sliding spindle 160 along the center line of barrel 144, the width of annular orifice 182 between conical surface 180 of deflecting member 176 and the discharge end of the barrel may be increased or decreased. With a small gap the violence with which the slurry is expelled by the air through the annular opening is great, the explosive or disintegrating action on the slurry leaving the opening is intense and a small droplet size is produced. With a large gap the action is correspondingly reduced and a larger droplet size is produced.

A secondary means of controlling the size of droplets produced by the gun is by control of the rate at which compressed air is admitted to the gun. In operation, by suitable adjustment of the annular discharge orifice with or without concurrent adjustment of the amount of compressed air admitted to the gun, it is possible to maintain a given range of droplet size in the spray produced with wide variations in the amount of slurry which is fed through the gun and into the furnace.

It may be helpful to consider in more detail what happens to slurry 18 as it issues from the feed gun. Since the free and open end of the feed gun depends vertically (Fig. 1) into freeboard 112 at its topmost portion, the slurry is sprayed downwardly and outwardly in a hollow cone-like stream 186 through the highly heated roaster gases rising from the bed. As the slurry leaves the gun it is deflected from conical surface 180 into a multitude of minute droplets or globules 188. Some of them are formed of freed slurry liquid; and others are formed of concentrate particles, held together by retained or contained liquid, which may be regarded as wet agglomerates formed in situ. The newly formed droplets of liquid and concentrate agglomerates are instantly spread out laterally and thus are prevented from coalescing into larger droplets and agglomerates. That part of the path of travel may be referred to for convenience as zone A. Due to the elevated temperature of the freeboard, some of the freed slurry liquid and some of the retained slurry liquid is vaporized.

The thus separated droplets and agglomerates descend into and through what may be considered as zone B. Here much, if not all, of the remaining freed slurry liquid is evaporated and removed from the freeboard through duct 116. Some of the slurry liquid retained by the agglomerates is boiled off.

Such freed and retained slurry liquid as remains is evaporated as the wet agglomerates enter and pass through what may be called zone C, immediately above the fluidized bed. Here the agglomerates fall through the rising roaster gases at just about their highest temperature and are thoroughly dried before they reach the bed.

It will be understood that what has been said is intended as a general explanation of what appears to occur. There is no clear-cut boundary between the zones, there must be some overlapping, due to the wide range of liquid droplet and concentrate agglomerate sizes. But, in any event, the path of travel pursued by the slurry as such, its resulting liquid droplets and concentrate agglomerates, through the freeboard is so long, so extended, as to provide ample time for the slurry liquid, both free and contained, to be evaporated and for the agglomerates to become thoroughly dried before they reach the bed.

In other words, no liquid is permitted to reach the bed, by way of the slurry or in any other way. This elimination of liquid and the drying of the agglomerates is facilitated to a considerable extent by the fact that the spray is generally in the form of a hollow cone. This means that highly heated roaster gases rise from the bed and pass upwardly into the hollow portion 190 of the hollow conical spray. Since the sprayed liquid droplets and freshly formed concentrate agglomerates are spaced from each other, they are surrounded by the highly heated roaster gases moving generally in a countercurrent direction. Since each liquid droplet and each concentrate agglomerate is continuously surrounded by the hot gases, the liquid is evaporated and the agglomerate is quickly dried. Thus; all of the slurry liquid is vapored in transit; its vapors mix with the rising roaster gases; and the gas-vapor mixture is removed continuously from the upper portion of the freeboard by way of duct 116, cyclone 118, pipe 122, cyclone 120 and stack 124.

In the specific practice of the invention referred to above, the rate at which the 65 percent solids slurry was forced through the gun varied between 7 and 14 U.S. gallons per minute; the volume of the compressed air used was held between 20 and 30 standard cubic feet per minute; and the gap between the deflecting cone member and the inner surface of the barrel measured normally to the surface was varied between $5/16''$ and $3/16''$ to maintain a constant spray droplet size range. The spray droplet size range was such that the agglomerates produced by evaporation of the liquid content of the droplets had the typical screen analysis shown in Table I.

Table I

| Mesh: | Weight Percent |
|---|---|
| +10 | 12.15 |
| +14 | 13.80 |
| +20 | 16.65 |
| +28 | 20.70 |
| +35 | 15.70 |
| +48 | 11.30 |
| +65 | 4.75 |
| +100 | 3.30 |
| -100 | 1.65 |

To release tramp bodies which are present in the slurry and which will lodge in the annular orifice and block the orifice, the spindle is moved momentarily along the center line of the barrel until the orifice is larger than the tramp particle and the particle is discharged from the feed gun. By this means the continuous flow of slurry through the gun is not interrupted nor is it necessary to remove the gun from the furnace to clear blockages.

Furthermore, the slurry liquid and the wet or damp agglomerates, before they are dried, perform a highly useful function during their short-lived period of travel, that of intercepting, catching and returning a very substantial amount of dust or powder-like fines to the roaster bed. The slurry and agglomerates tend to act like a moving filter. Dust particles are entrained by the slurry liquid. Such entrained dust may in turn become attached to wet concentrate agglomerates or indeed may be converted into dust agglomerates which fall to the bed. A substantial amount of the dust particles as such come in contact with and are attached to the falling wet or damp concentrate agglomerates, often becoming an integral part thereof. Such dust as is not returned to the bed finds its way to duct 116 and cyclones 118 and 120; but the dust that adheres to falling agglomerates is thoroughly dehydrated en route to the bed.

Every precaution is thus taken to assure a dry bed of agglomerates, in what may be designated as zone D, thus preventing them from bonding, due to the presence of moisture, into oversize lumps which would operate to defluidize the bed. For this reason the freeboard should be rather high, so that the period of suspension of the falling slurry and agglomerates will be sufficiently long to permit the evaporation of all of their liquid or moisture. To this end it is better to err on the side of having the height of the freeboard somewhat higher than is necessary normally to effect the desired dehydration.

As shown in Fig. 1, the agglomerates dried in transit strike the top of bed 110 in a generally circular area. Air under pressure is passed simultaneously through distributor line 84, through branch outlets 86, 88, 90 into compartments 74, 76 and 78 of wind-box 72. The amounts of air may be varied as between the compartments by means of valved meters, not shown. The air in the compartments issues from the numerous air nozzles 94 above hearth plate or plates 70 in a large number of fine streams. These many streams of air keep the finely divided agglomerates in the bed in a turbulent agitated state, thus facilitating the mixing of the new with the old agglomerates and providing intimate contact of the air with the agglomerates. Each agglomerate in effect is enveloped in and supported by air and the gaseous products of the roating reactions, thus establishing an environment conducive to oxidation of the sulphides in the concentrate particles.

When in full operation, calcined agglomerates are withdrawn from the bed through discharge conduit 104 as fast as freshly formed agglomerates from the sprayed slurry are deposited on the bed.

The roasting operation requires a considerable amount of air. All of the water in the slurry is converted to steam. The sum total of air, gas and steam is quite substantial and is withdrawn continuously from the freeboard, as a result of which a large amount of sulphur gas, $SO_2$ and $SO_3$, is formed. Some fines, although a relatively small amount, are produced necessarily during the roasting operation.

It is preferred to return the separated fines from the cyclones to the fluidized bed. To this end they are permitted to drop by gravity through down-comers 126 and 128 into feed tube 130 where they are propelled by screw-conveyor 132 into bed 110 of the roaster.

It will be clear to those skilled in this art that the above description is by way of example and that the practice of the invention lends itself readily to a number of useful modifications.

We claim:

1. In the method of roasting metal bearing ores and the like in a confined chamber having a hearth for receiving and treating a bed of the ore and a freeboard space between the hearth and roof of the chamber through which a slurry of the ore is sprayed, the improvement which comprises bringing together a stream of the slurry and a stream of compressed air in the charging end of an elongated passageway, the streams being introduced into said passageway at an acute angle to the direction of travel of the slurry and air through the passageway, at opposite sides thereof, in substantially the same transverse plane and in opposition to each other, dividing the stream of air into a multiplicity of pockets, dividing the slurry into a multiplicity of slugs, conducting the resultant stream including the multiplicity of air pockets and the multiplicity of slugs concurrently along the passageway under positive pressure and through a zone in the end portion of said passageway having a cross-sectional area substantially less than the cross-sectional area of said passageway to cause a restriction of said resultant stream and a momentary ejection of the air pockets and slurry slugs from the discharging end of the passageway with explosive violence as a spray into the freeboard with a simultaneous reduction of pressure in the passageway, momentarily increasing the pressure of the air pockets and slurry slugs of said resultant air stream in the passageway, again momentarily ejecting air pockets and slurry slugs from the passageway with explosive violence as a spray into the freeboard, and repeating said increase and decrease in pressure and ejection of air pockets and slurry slugs from the passageway to produce a rapid pulsating action.

2. Method according to claim 1 in which the introduction of the spray into said chamber is sufficiently above the bed of ore on the hearth that liquid in the spray is evaporated before the solid components thereof reach the upper surface of said bed.

3. Method according to claim 1 in which the slurry slugs are ejected into the freeboard in the form of a conical spray.

4. In the method of roasting metal bearing ores and the like in a confined chamber having a hearth for receiving and treating a bed of the ore and a freeboard space between the hearth and roof of the chamber through which a slurry of the ore is sprayed, the improvement which comprises bringing together a stream of the slurry and a stream of compressed air in the charging end of an elongated passageway, dividing the stream of air into a multiplicity of pockets, dividing the slurry into a multiplicity of slugs, conducting the resultant stream including the multiplicity of air pockets and the multiplicity of slugs concurrently along the passageway under positive pressure and through an annular zone in the end portion of said passageway having a cross-sectional area substantially less than the cross-sectional area of said passageway to cause a restriction of said longitudinal stream and a momentary ejection of the air pockets and slurry slugs from the discharging end of the passageway with explosive violence as a hollow conical spray into the freeboard with a simultaneous reduction of pressure in the passageway, momentarily increasing the pressure of the air pockets and slurry slugs of said resultant air stream in the passageway, again momentarily ejecting air pockets and slurry slugs from the passageway with explosive violence as a spray into the freeboard, and repeating said increase and decrease in pressure and ejection of air pockets and slurry slugs from the passageway to produce a rapid pulsating action.

5. Method according to claim 4 in which the hollow conical spray is sub-divided into a multiplicity of liquid droplets and concentrate agglomerates.

6. Method according to claim 5 in which hot roaster gases from the hearth bed rise inside the hollow cone of sprayed liquid droplets and concentrate agglomerates to facilitate the evaporation of liquid droplets and the drying of the concentrate agglomerates.

7. Method according to claim 1 in which hot roaster gases from the hearth bed rise inside the hollow conical spray to facilitate evaporation of free and contained liquid.

References Cited in the file of this patent

UNITED STATES PATENTS

| | | |
|---|---|---|
| 1,923,866 | Hechenbleikner | Aug. 22, 1933 |
| 2,595,759 | Buckland et al. | May 6, 1952 |
| 2,747,846 | True | May 29, 1956 |
| 2,813,015 | Thornhill | Nov. 12, 1957 |
| 2,813,016 | Thornhill | Nov. 12, 1957 |

FOREIGN PATENTS

| | | |
|---|---|---|
| 537,802 | Belgium | Apr. 30, 1954 |